United States Patent [19]

Petersmann et al.

[11] Patent Number: 5,433,677
[45] Date of Patent: Jul. 18, 1995

[54] METHOD FOR AUTOMATIC CONTROL OF AN RPM-CHANGING ENGAGING DEVICE OF A MOTOR VEHICLE

[75] Inventors: Joseph Petersmann, Wimsheim; Willi Seidel, Eberdingen-Hochdorf; Heinz Stehle, Weissach; Werner Möllers, Wiernsheim; Udo Hickmann, Mühlacker, all of Germany

[73] Assignee: Dr. Ing. h.c.F. Porsche AG, Weissach, Germany

[21] Appl. No.: 167,923

[22] PCT Filed: May 21, 1992

[86] PCT No.: PCT/EP92/01138
§ 371 Date: Dec. 21, 1993
§ 102(e) Date: Dec. 21, 1993

[87] PCT Pub. No.: WO93/00228
PCT Pub. Date: Jan. 7, 1993

[30] Foreign Application Priority Data

Jun. 21, 1991 [DE] Germany ............ 41 20 602.9

[51] Int. Cl.⁶ ............... B60K 41/02; F16D 48/06
[52] U.S. Cl. ................... 477/169; 192/3.3; 192/103 F; 477/176
[58] Field of Search ............ 477/169, 39, 176, 64; 192/103 F, 3.3

[56] References Cited

U.S. PATENT DOCUMENTS

| | | |
|---|---|---|
| 4,622,865 | 11/1986 | Itoh et al. |
| 4,648,496 | 3/1987 | Petzold et al. ............ 477/39 |
| 5,160,003 | 11/1992 | Suzuki ............ 477/39 X |
| 5,176,234 | 1/1993 | Reik et al. ............ 477/74 X |

FOREIGN PATENT DOCUMENTS

| | | |
|---|---|---|
| 0276022 | 7/1988 | European Pat. Off. |
| 0326274 | 8/1989 | European Pat. Off. |
| 3341652 | 6/1985 | Germany |
| 3443064 | 6/1986 | Germany |
| 3922051 | 1/1991 | Germany |

Primary Examiner—Rodney H. Bonck
Attorney, Agent, or Firm—Evenson, McKeown, Edwards & Lenahan

[57] ABSTRACT

An rpm-changing engaging device of a motor vehicle is controlled during an engaging process in such fashion that a curve is selected according to which the rpm difference based on the input rpm of the engaging device is adjusted between the input rpm of the engaging device and its output rpm by the engaging device indirectly or directly, corresponding to the value, determined prior to the engaging process or before the stopping of the motor vehicle, of a driving activity. A precondition is that the rpm difference, based on the input rpm of the engaging device and its output rpm. The curve is selected from a family of several engaging devices.

15 Claims, 5 Drawing Sheets

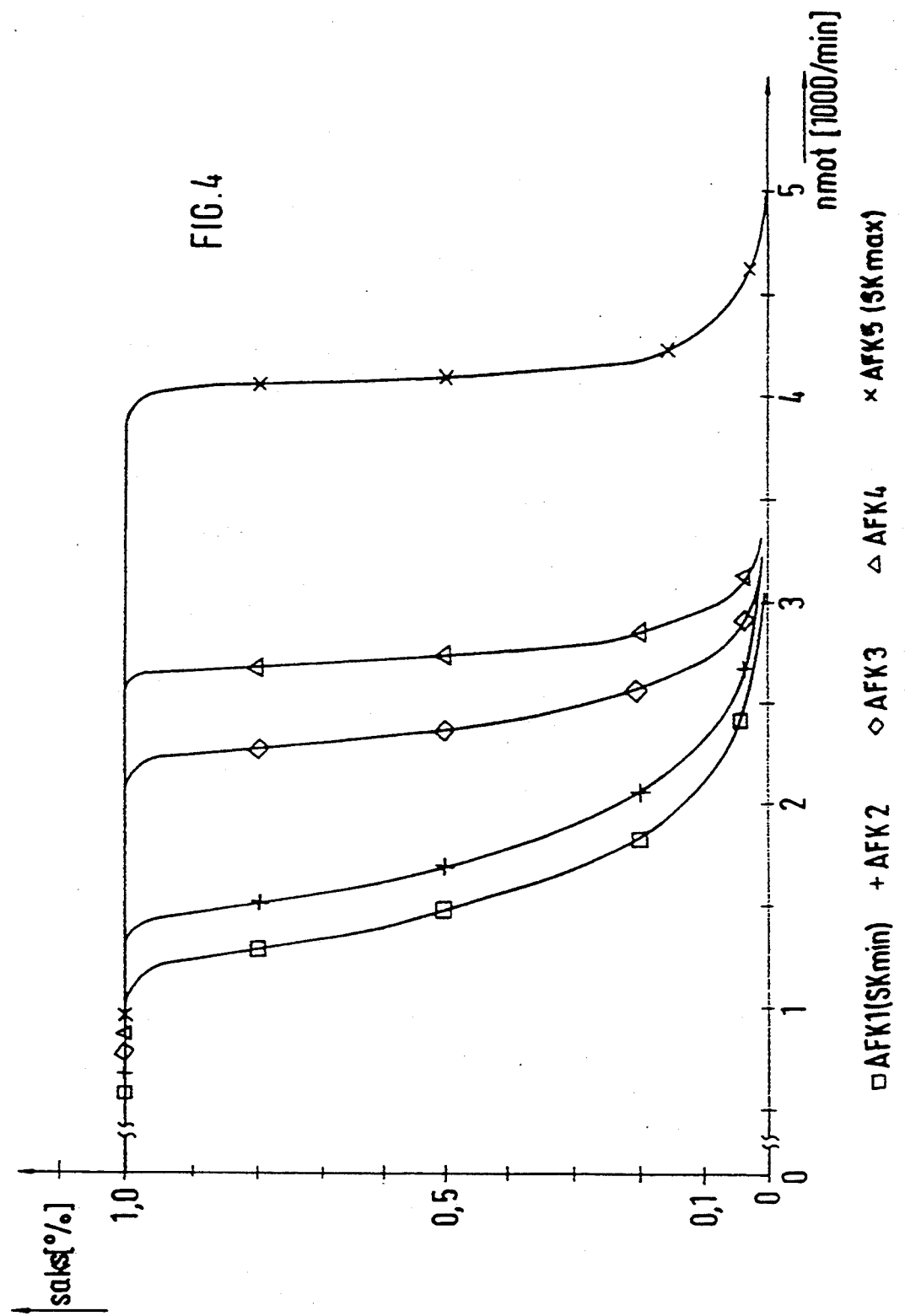

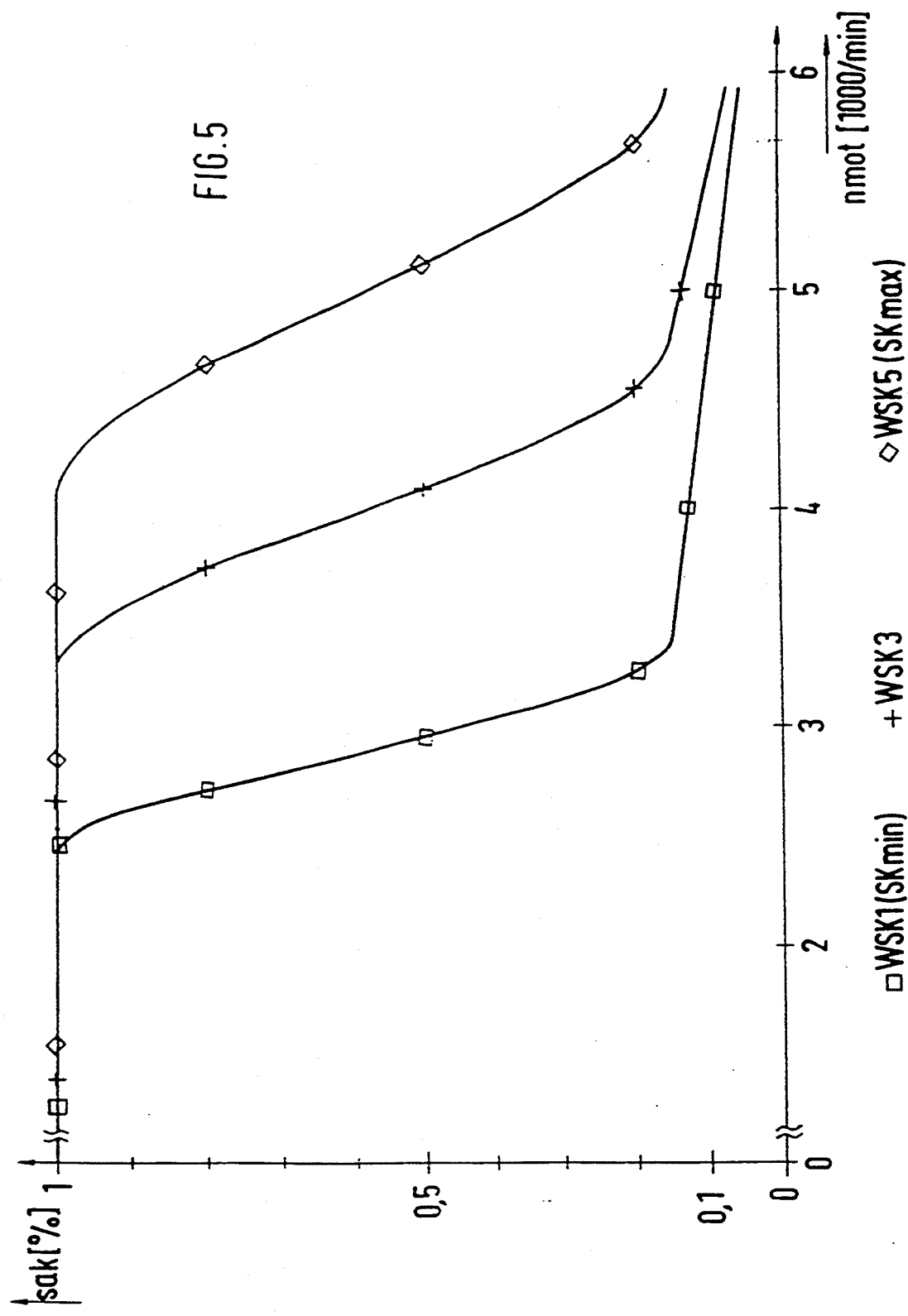

METHOD FOR AUTOMATIC CONTROL OF AN RPM-CHANGING ENGAGING DEVICE OF A MOTOR VEHICLE

BACKGROUND AND SUMMARY OF THE INVENTION

The invention relates to a method for controlling an rpm-converting engaging device of a motor vehicle driven by an internal combustion engine, preferably an accelerator pedal or a throttle, whereby the rpm difference based on the input rpm, i.e., the engine rpm nmot(t), of an engaging device is controllable between the input rpm of the engaging device and its output rpm, i.e., the transmission input rpm ne(t).

In motor vehicles with a manually actuated engaging device (friction clutch), by suitable actuation of the accelerator and clutch pedals the driver can structure an engaging process nearly freely within the physical limits of the system. This enables him to adjust the dynamics of the engaging process individually to his driving style or to a prevailing driving or traffic situation.

The driver will therefore adjust the engaging rpm of the engine and the slip of the clutch using the accelerator pedal and clutch in such a way that the engine generates the corresponding engaging torque or the corresponding engaging power that is correct for the situation.

The correct, and especially low-wear, control of the accelerator and clutch pedals by the driver however requires firstly a certain amount of skill and concentrated action; on the other hand, especially in so-called stop-and-go traffic, for example in densely populated areas and in heavy traffic, the constant actuation of the accelerator and clutch pedals is quite fatiguing.

Therefore, in the past, automatic engaging devices were developed for motor vehicles. These can be divided roughly into two groups:

engaging devices which act automatically without additional control means, for example centrifugal clutches and hydrodynamic torque converters, and engaging devices controlled separately by means of auxiliary energy, for example hydraulically actuated friction clutches or electromagnetic powder clutches.

While in the engaging devices of the first group the torque or power transmitted depends primarily upon the slip in the engaging device, and/or the input rpm and the effect of these parameters on the torque or power is largely determined by the structural design, the engaging devices of the second group are largely flexible both in terms of the influential parameters as well as their effect.

On the other hand, the engaging devices of the first group are relatively problem-free as regards wear and heating, while the overly-free design of the control engaging devices in the second group has limits placed upon it in this regard: monitoring devices for wear and heating are therefore nearly unavoidable.

In order to keep the cost of controls for engaging devices of the second group as low as possible, these controls are frequently so designed that they simulate a centrifugal clutch or hydrodynamic torque converter in their behavior. In this manner, however, the behavior of such a system is once again largely fixed.

From European Patent document EP 0 276 022 A2, a control device is known for a vehicle clutch which, for the purpose of controlling the starting operation, determines the rotational speeds of the driving and the rotational speeds of the driven parts of the clutch and, as a function thereof, controls the clutch engagement such that this clutch engagement follows a preset clutch engagement.

Taking its departure from this prior art, the goal of the invention is to provide a method for automatic control of a torque-converting engaging device for a motor vehicle, which adjusts itself automatically to the driving behavior of a driver of the motor vehicle or to a currently prevailing traffic situation and controls the engaging processes according to the situation.

The goal is achieved according to the invention by a method for controlling an rpm-converting engaging device of a motor vehicle driven by an internal combustion engine, whose engine is influenceable by a power control element, preferably an accelerator pedal or a throttle, whereby the rpm difference based on the input rpm, i.e., the engine rpm nmot (t), of an engaging device is controllable between the input rpm of the engaging device and its output rpm, i.e., the transmission input rpm ne(t). A characteristic curve is selected along which the respective rpm difference is adjusted at least during an engaging process by the engaging device indirectly or directly as a function of at least the engine rpm, corresponding to the value of a driven activity which is determined prior to the engaging process or prior to stopping the motor vehicle and which evaluates the driver's driving style or his actions caused by the traffic situation, from a family of several engaging characteristic curves.

The advantages of the invention lie primarily in the fact that a method for automatic control of a torque-converting engaging device for a motor vehicle is provided that adjusts automatically and optimally to the driving behavior of a driver of a motor vehicle or to a prevailing traffic situation and correspondingly permits engaging processes correct for the situation to proceed largely automatically.

The control according to the invention also makes it possible to control the engaging device according to relatively simple functions, whereby only parameters of the function corresponding to a driving activity determined from at least one operating parameter of the motor vehicle are varied.

This is accomplished primarily by a curve according to which an rpm differential $(sak(t))$ related to the input rpm, between the input rpm and the output rpm of the engaging device, is adjusted at least during one engaging process by the engaging device being adjusted indirectly or directly as a function of at least the input rpm (engine rpm nmot(t)), corresponding to the value determined prior to the engaging process or prior to the stopping of the motor vehicle, of the driving activity $(SK(t))$ from a family of several engaging curves $(AFKi; i=1, 2, \ldots, 5)$.

The method according to the invention is advantageously applicable to engaging devices which operate automatically without additional control means, for example centrifugal clutches and hydrodynamic torque converters (to the extent that these are controllable in their recognition or in their impressed curve, and also to engaging devices that are controlled separately by auxiliary energy, as for example electrohydraulically actuated friction clutches or electromagnetic powder clutches.

The invention will now be explained with reference to the embodiments shown in the drawings, without limitation of generality, using the example of a continuously variable transmission.

BRIEF DESCRIPTION OF THE DRAWINGS

FIG. 4 is a family of engaging curves which allocate certain values of a clutch set slip to the engine rpm values, and FIG. 5 is a family of impressed curves of a torque converter.

DETAILED DESCRIPTION OF THE DRAWINGS

Figure 1:
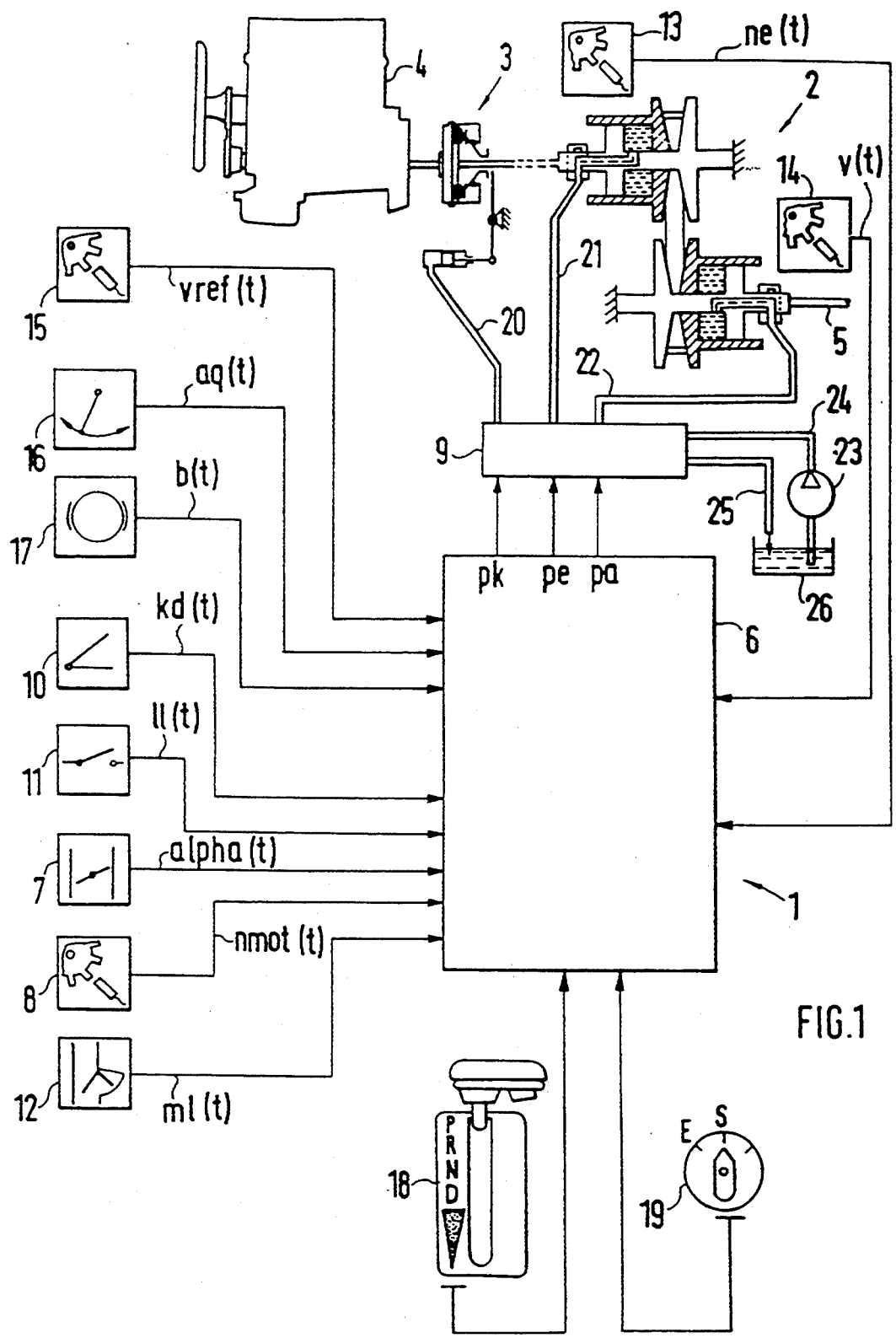
FIG. 1 is a block diagram of an electrical control for a continuously variable transmission of a motor vehicle.

In FIG. 1 reference numeral 1 refers to a control of an electrohydraulically actuated continuously variable transmission 2 using the example of a friction transmission. Continuously variable transmission 2 is driven through a controllable engaging clutch 3 by an internal combustion engine 4. A driveshaft 5 of continuously variable transmission 2 is connected with a wheel drive, not shown, of a motor vehicle.

In the following, functions or variables that change with time t are termed functions f(t) of time t.

A control device 6 controls a hydraulic valve body 9 at least as a function of throttle position alpha(t) of a throttle sensor 7 and an engine rpm nmot(t) of an engine rpm sensor 8 of internal combustion engine 4. To control continuously variable transmission 2 and engaging clutch 3, control device 6 contains, as further input parameters or measured parameters, a kick-down signal kd(t) from a kick-down switch 10, a neutral signal 11(t) from a neutral switch 11, an air volume or air mass ml(t) (for internal combustion engine 4) from an air volume or air mass sensor 12 and the transmission input rpm ne(t) from a transmission input rpm sensor 13 as well as a driving speed v(t) from a driving speed sensor 14 of the motor vehicle (transmission output rpm).

In addition, a speed vref(t) from a reference speed sensor 15 on a vehicle axle, not shown, a transverse acceleration aq(t) from a transverse acceleration sensor 16 and a brake signal b(t) from a brake signal sensor 17 are detected and processed by control device 6.

Finally, control is usually influenceable by the vehicle driver through a selector lever 18 for selecting gears P (park), R (reverse), N (neutral), D (automatic adjustment of the gear ratio ue of the continuously variable transmission); in addition, an adjustment range of selector lever 18 is provided for direct selection of gear ratio ue.

In ordinary transmission controls, the control curve according to which control device 1 controls the continuously variable transmission in gear D is selected by a program selector switch 19. As a rule, two control curves RKLj can be selected, whereby in the E position a consumption-optimized control curve RKL1, and in the position S a performance-optimized control curve RKL5, can be selected manually.

Alternatively, to program selector switch 19, a control method can also be implemented in control device 6 which, for example according to DE 33 41 652 C2 or DE 39 22 051 A1, evaluates the driving style of a driver or his behavior as a function of a traffic situation relative to the control of the motor vehicle and derives a driving activity SK(t) (accelerator pedal activity) from one or more operating or driving parameters. On the basis of this driving activity SK(t), corresponding to a switch position of program selector switch 19, one of a plurality of control curves RKLj (j=1, 2, ..., 5) can be then used to control the continuously variable transmission or engaging clutch 3.

Without limitation of generality, continuously variable transmission 2 can also be controlled, instead of by control curves, by control characteristic diagrams as a function of several arbitrary or driving parameters of the motor vehicle.

Depending on the parameters mentioned, control device 6, through a signal output pk and valve body 9, controls the hydraulic pressure in engaging clutch 3 and through signal outputs pe and pa and hydraulic valve body 9 controls the gear ratio ue(t) between the transmission input rpm ne(t) and the transmission output rpm (driving speed) v(t).

The gear ratio ue(t) here is proportional to the quotient of the transmission input rpm ne(t) and the driving speed v(t): ue(t)=prop*(ne(t)/v(t)); prop corresponds to a proportionality factor. A numerical increase or decrease in the gear ratio ue(t) here represents a shift to short/long.

Hydraulic valve body 9 connects the corresponding control lines 20, 21, and 22 of engaging clutch 3 and continuously variable transmission 2 with a pressure line 24 connected to a pump 23 or a return line 25 to a supply tank 26 for hydraulic fluid.

Figure 2:
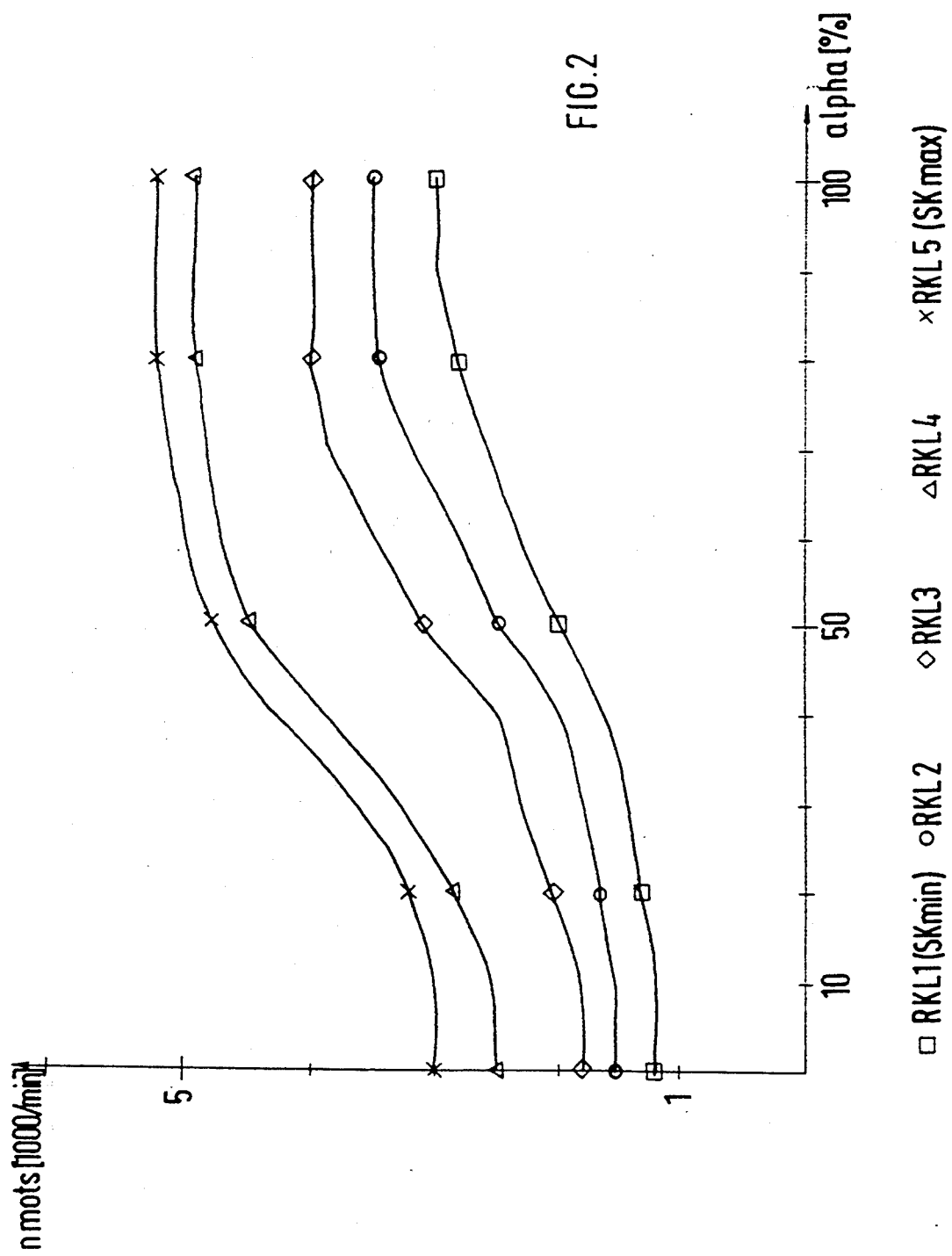
FIG. 2 is a family of several control curves which allocate certain values of the engine rpm setpoints to the values of the throttle angle.

The gear ratio ue of the transmission is indirectly adjusted automatically by control device 6 and valve body 9 through control curves RKLj, at least as a function of the throttle position alpha(t) and the engine rpm nmot(t); control curve RKLj, corresponding to the driving activity SK(t) which evaluates the driving style of the driver or his behavior in traffic situations relative to the control of the motor vehicle, is selected from a family of several control curves RKLj (j=1, 2, ..., 5) corresponding to FIG. 2.

The control curves shown in FIG. 2 here cover the area between a control curve RKL1 which permits a consumption-optimized operation of the motor vehicle and a control curve RKL5 on which the motor vehicle can be operated with optimum performance, at least stepwise (for increasing values of driving activity SK(t)).

Thus the control of continuously variable transmission 2 automatically adjusts to the driving style of the driver so that manual intervention or switching of the control curves need not be undertaken. Program selector switch 19 is therefore eliminated.

The gear ratio ue of continuously variable transmission 2 is preferably adjusted by control device 6 in such fashion that rpm nmot(t) is adjusted as optimally as possible to an engine rpm setpoint nmots. For this purpose, a subordinate rpm control can be implemented in control device 6. Gear ratio ue is therefore a function of the engine rpm setpoint nmots, the engine rpm nmot, and time t: ue=f(nmots, nmot, t). A deviation D nmot(t)=nmots(t)−nmot(t) of engine rpm nmot(t) from the engine rpm setpoint nmots(t) is moved toward 0.

The momentary value of the engine rpm setpoint nmots is determined from the momentarily selected control curve RKLj according to FIG. 2 from the momentary value of the throttle position alpha(t) and the driving activity SK(t): nmots=RKLj(alpha, SK). Here again the control curves RKLj can be expanded into control characteristic diagrams in order to make the control of transmission 2 dependent upon additional parameters.

As shown in FIG. 2, control curves RKLj essentially run as follows: control curves RKLj have a progressive pattern in a lower value range of the throttle position alpha, said pattern making a transition in a middle range of throttle position alpha to a degressive pattern. The throttle position alpha is plotted on the horizontal axis in percent; the value of 0% corresponds to a closed throttle and the value 100% corresponds to the fully opened throttle.

Five control curves RKL1, RKL2, RKL3, RKL4, and RKL5 are plotted with control curve RKL1 permitting consumption-optimized operation of the motor vehicle and being selected with minimum driving activity SK(t)=SKmin. Control curve RKL5 is selected with maximum driving activity SK(t)=SKmax when performance-optimized operation of the motor vehicle is possible. The control curves RKL2 to RKL4 which are located between are staggered with increasing values of driving activity SK(t) for control.

According to DE 33 41 652 C2 or DE 39 22 051 A1, driving activity SK(t) is determined by a functional relationship that evaluates the driving style of the driver or his behavior as a function of traffic situations in the long term from current and past values, determined cyclically or anticyclically, of a single operating parameter or a single value assembled from several operating parameters of a motor vehicle.

Here, for example, values of throttle position alpha(t), driving speed v(t) and transverse acceleration aq(t) in the second and millisecond range are detected and additional values are calculated from them, for example the throttle change rate dalpha(t)/dt and the acceleration of the vehicle dv(t)/dt. The determined and calculated values are linked by characteristic diagrams with other operating parameters and combined by means of a functional relationship into an intermediate value from which a driving activity SK(t) is determined by sliding averaging, which takes into account in the long term both the newly calculated values and the past values.

Finally, through another functional relationship, this driving activity SK(t) is assigned to a control curve RKLj corresponding to the manner shown in DE 39 22 051 A1.

It has been found, especially in conjunction with continuously variable transmissions, that it can be advisable to interrupt the evaluation of the driver's driving style or his behavior as a function of traffic situations in specific operating states of the motor vehicle.

A first operating state occurs when the motor vehicle stops with the engine running. This first operating state can be defined for example by driving speed v(t)≈0 and engine rpm nmot(t)>0(engine rpm nmot(t) corresponds to idle rpm: nmot(t)=nl1). Here, the momentary value of the driving activity SK(t), at least for the period for which the respective operating state exists, is stored and evaluation is continued following this period of time using the stored value for driving activity. This ensures that the driving activity SK(t) during long stops of the motor vehicle with the engine running, for example stopped at a traffic light, will not drop to the minimum value SKmin.

A second operating state occurs as soon as the motor vehicle is parked. This operating state is characterized by a driving speed v(t)≈0 and engine rpm nmot(t)≈0 or a shutoff ignition of the motor vehicle or of the driving (internal combustion) engine. Here again the momentary value of the driving activity SK(t) can be stored at least for the period of time for which the respective operating state occurs and the evaluation can be continued following this period of time using the stored value of the driving activity.

In addition, in an advantageous manner, a pushbutton switch, operated manually by the vehicle driver (for example in the vicinity of the dashboard of the motor vehicle) can be provided by which the driving activity SK(t) can be reset to a basic value, for example the value SKmin.

As an alternative to the second operating state, under the conditions then prevailing, the driving activity can also be reset automatically to the basic value SKmin (third operating state).

The driving activity SK(t), without interruption of the evaluation of the driving style of the driver or his behavior in traffic situations, is temporarily set to a value SKmax (control curve RKL5 that permits performance-optimized operation of the motor vehicle, when the change as a function of time in the throttle position dalpha/dt exceeds a first (positive) boundary value alpha1 and as long as the throttle position alpha(t) has not yet undershot a fixed value afg: alpha(t)>afg. This ensures that the driver, in the event of a sudden increase in the power requirement, can obtain a performance-operated control function if he does not operate kick-down switch 10 (rapid depression of the accelerator pedal, without reaching the stop and thus actuating kick-down switch 10).

In another embodiment of the invention, the gear ratio ue of the transmission is maintained when a state of a gear-ratio retention usf is active (usf=1) whereby the state of the gear-ratio determination moves to the active state, usf=1, when the change as a function of time dalpha(t)/dt of throttle position alpha(t) exceeds a second (negative) boundary value —alphag2 and coasting operation is recognized. The state of the gear-ratio determination usf after a first period of time TI(SK(t)) has elapsed makes a transition to the inactive state usf=0 when acceleration is recognized.

Alternatively, as long as the state of the gear-ratio determination usf is active, usf=1, the gear ratio ue can be adjusted (lowered) at a certain finite and relatively slow speed (first change as a function of time in gear ratio ck1=due/dt=f(SK(t)) to the value of gear ratio ue which is provided at the momentary operating point of the motor vehicle (alpha(t), v(t), nmot(t), t) on the momentarily selected control curve RKLj. The state of the gear-ratio determination changes to the active state usf=1 when the change as a function of time dalpha/dt of throttle position alpha(t) undershoots the second (negative) boundary value —alphag2 and coasting operation is recognized. The state of gear-ratio determination usf, following expiration of a second period of time T2(SK(t)) changes to the inactive state, usf=0, when acceleration is recognized.

These two cases take into account approaches to curves, when it has been found that a driver of a motor vehicle backs off more rapidly on the accelerator pedal than if he wanted to stop the vehicle or let it coast. The gear ratio set before the two cases occur, contrary to otherwise conventional transmission controls, is held for the specified period T1 or T2 or lowered at a reduced speed.

Figure 3:
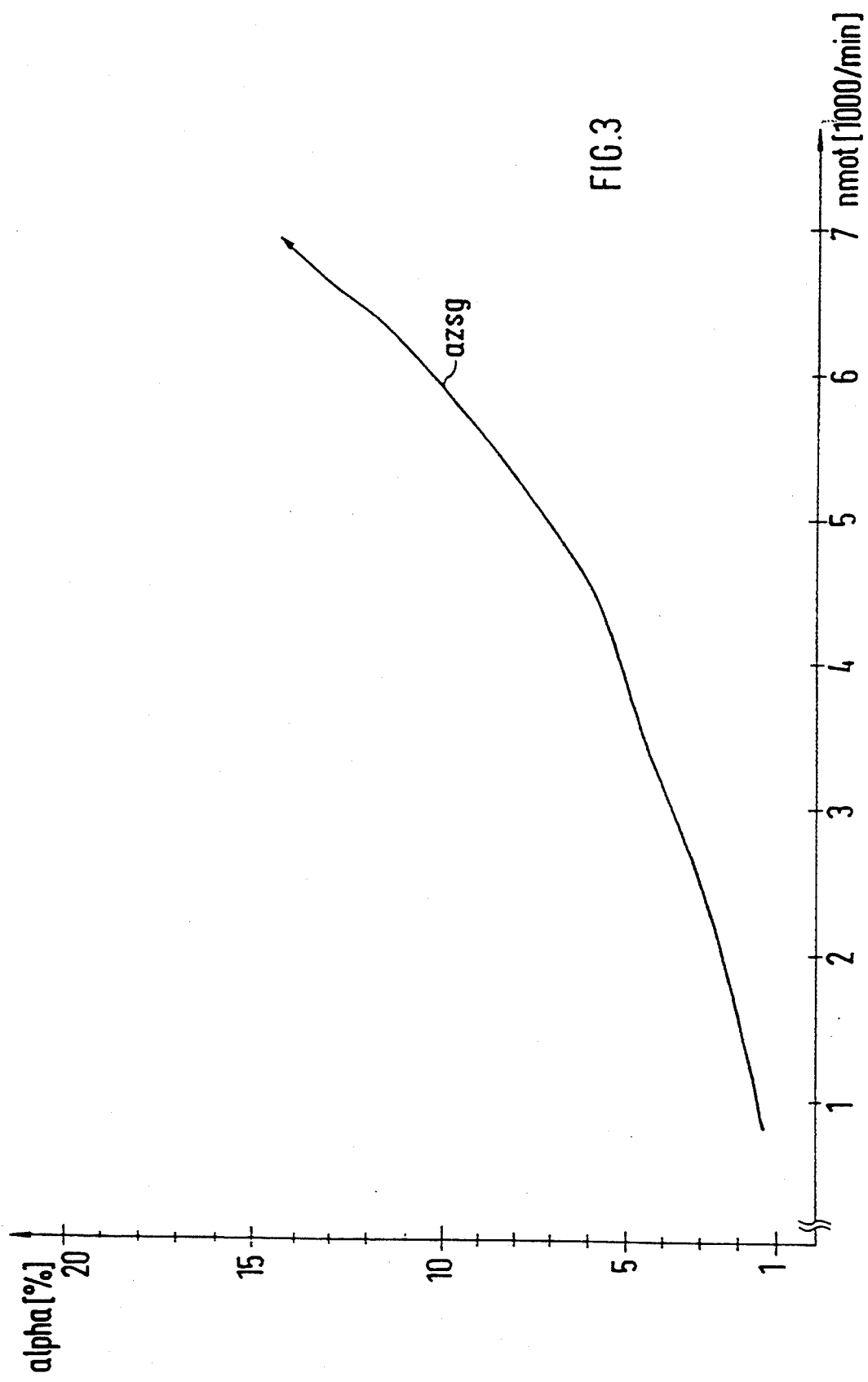
FIG. 3 is an engine rpm dependent boundary curve which the difference between coasting operation and accelerating operation follows.

The terms "coasting operation" and "acceleration" are defined as follows:

coasting operation is recognized when the throttle position alpha(t) drops below an engine rpm-dependent boundary curve azsg(nmot) as shown in FIG. 3: alpha (t) < azsg(nmot).

acceleration is recognized when the throttle position alpha(t) exceeds the engine rpm-dependent boundary curve azsg(nmot) according to FIG. 3 and the change with time in the driving speed dv(t)/dt assumes positive values: alpha(t) > azsg(nmot dv(t)/dt > 0.

Following deactivation of the gear-ratio determination (usf=1→usf=0) in coasting operation, the gear ratio ue(t) is adjusted at a certain adjusting speed due/dt=FDUE(nmot, SK) from the value at the transition to coasting operation to the next closest or necessary value for reaching the preset engine rpm setpoint Mots(t). This engine rpm setpoint nmots(t) is preset by the momentarily selected control curve RKLJ according to FIG. 2) with throttle closed, alpha(t)≈0): nmots=RKLj(alpha≈0, SK(t)). The adjusting speed of the gear ratio due/dt here is preferably determined by means of an experimentally determined characteristic diagram FDUE(nmot, SK) from the momentary values or those determined during the transition to coasting operation, of the engine rpm nmot(t) and driving activity SK(t).

Alternatively, following deactivation of the gear-ratio determination (usf=1 →usf=0) in coasting operation, the gear ratio ue(t) can be adjusted so that the engine rpm nmot(t) is lowered at a certain adjusting speed dnmot(t)/dt=FDNMOT(nmot, SK) from the value at the transition to coasting operation, to the engine rpm setpoint nmots(t)=RKLj(alpha≈0, SK(t). The adjustment rate of the engine rpm dnmot/dt is also obtained here again by means of an experimentally determined characteristic diagram FDNMOT(nmot, SK) from the momentary values or those determined at the transition to coasting operation, of the engine rpm nmot(t) and driving activity SK(t).

The adjustment rate of the engine rpm dnmot(t)/dt can be kept constant provided the engine rpm nmot(t) reaches the value of the engine rpm setpoint determined by the control curve obtained from the momentary control curve or that determined at the transition to coasting operation and the engine rpm has not yet undershot a boundary value nmotg(SK(t)): nmot(t) > nmotg(SK(t)).

Boundary value nmotg(SK(t)) here again can depend upon driving activity and increase with increasing driving activity. Following an undershoot of the boundary value nmot(t), the momentarily adjusted gear ratio ue(t) is maintained until the engine rpm nmot(t) has reached the idle rpm nmot11 of the internal combustion engine. Finally, when idle rpm reached is nmot11, engaging clutch 3 is freed.

The control of the gear ratio and engine rpm described here means that the braking action of the engine in coasting operation and non-active gear-ratio determination usf=0 have a greater effect on the deceleration of the motor vehicle.

According to the invention, an engaging curve AFK(SK(t)), by which an engaging clutch 3 connected ahead of continuously variable transmission 2 is controlled as a function of at least the engine rpm nmot(t) in an engaging process, corresponding to the value, determined prior to the engaging process or prior to the stopping of the motor vehicle, of the driving activity SK(t) from a family of several engaging curves AFKi (i=1, 2, ..., 5), see FIG. 4: AFK1 for SKmin, AFK2 to AFK4 graduated according to increasing values of driving activity SK(t) and AFK5 for SKmax.

This makes it possible to adjust an engagement point at which the difference in rpm Dk(t)-nmot(t)-ne(t) between the engine rpm nmot(t) and the transmission input rpm ne(t) becomes 0, corresponding to driving activity SK(t). At higher values of the driving activity, the engagement point moves toward a higher engine rpm and, in internal combustion engines, is displaced toward higher values of the engine torque or engine power.

The pressure on the frictional elements of the engaging clutch 3 is adjusted in such fashion that the rpm differential related to the engine rpm nmot(t) (clutch slip) sak(t)=Dk(t)/nmot(t)=nmot(t)-ne(t))/nmot(t) between the engine rpm and nmot(t) and the transmission input rpm ne(t) on the engaging curve AFK(SK(t)) according to FIG. 4 assigned to a momentary value of the engine rpm nmot follows required clutch slip saks(t); this can be accomplished for example by means of a subordinate control circuit.

The engaging curves AFK(SK(t)) show increasing values of engine rpm nmot for falling values of required clutch slip. With increasing values of driving activity SK(t), the engaging curves AFK(SK(t)) are displaced toward higher values of engine rpm nmot.

Advantageously the engaging clutch is free when, in coasting operation, an amount of a differential speed |Dv(t)| = |vref(t)-v(t)| between a speed vref(t) of a nonpowered axle and the driving speed v(t) determined on a powered axle exceeds a permissible differential speed value Dvzul(SK(t)): |Dv(t)| < Dvzul(SK(t))|. With this measure, excessive brake slip can be reduced.

Provided the motor vehicle is equipped, instead of an engaging clutch, with a controllable torque converter as the rpm-converting engaging device connected upstream of transmission 2, its pronounced characteristic WSK(SK(t)) (clutch or converter slip sak versus engine rpm nmot) corresponding to the value of the driving activity SK(t) determined prior to the engaging process or prior to the stopping of the motor vehicle is selected and is set softer at least during an engaging process with increasing driving activity SK(t).

The softer adjustment of curve WSK(SK(t)) permits higher rpms of the driving engine and hence provides higher values of the torque set for starting or the applied power. Corresponding converter curves WSK1(SK=SKmin), WSK3(SK) and WSK5(SK=SKmax) are shown in FIG. 5.

Advantageously, a value for the gear ratio ue(t) during an engaging process can be set to correspond to the value of the driving activity (SK(t) determined before the engaging process or before the stopping of the motor vehicle. With increasing driving activity SK(t) the value of the gear ratio during the engaging process is increased.

If the torque converter is equipped with a shiftable converter bridging clutch for bridging the torque converter, shifting limits at which the converter bridging clutch is opened (nmot(t) > wuko(SK(t)) or closed (nmot(t) > wuks(SK(t)), can depend at least on the driving activity (SK(t)). With increasing, more performance-oriented driving activity, the shift limits are displaced toward lower values.

Finally, driving or braking slip that occurs can be avoided advantageously by the momentarily set gear ratio ue of the transmission being reduced, provided the amount of the differential speed between the speed vref of a nonpowered axle and the driving speed v(t) determined on a powered axle exceeds the permissible differential speed value Dvzul(SK(t)). When the permissible differential speed value Dvzul(SK(t)) is exceeded, a converter bridging clutch of a transmission equipped with a torque converter can be free;

a holding time Th(SK(t)) can be used during which a reduction of the gear ratio cannot be suppressed; and an increase in the gear ratio is prevented, with these functions being restored when acceleration is recognized and positive values are available for the change in driving speed v(t) and the amount of differential speed Dr(t) is smaller than the permissible differential speed value Dvzul (SK(t)).

Time intervals Ti(SK(t)), T2(SK(t)), holding time Th(SK(t)), and the permissible differential speed value Dvzul(SK(t)) can depend upon driving activity SK(t). Time intervals Ti(SK(t)) and T2(SK(t)) increase with increasing driving activity SK(t), while holding time Th(SK(t)) and the permissible differential speed value Dvzul(SK(t)) can decrease with increasing driving activity SK(t). The time intervals and the holding time preferably vary within a range of 1 to 3 seconds.

What is claimed is:

1. Method for controlling an rpm-converting engaging device of a motor vehicle driven by an internal combustion engine, said engine being influenceable by means of a power control element, wherein an rpm difference (sak(t)) based on an input rpm (engine rpm nmot(t)) of the engaging device is controllable between the input rpm and an output rpm (transmission input rpm ne(t)), the method comprising the steps of:

selecting a characteristic curve from a family of several engaging curves (AFKi; i=1,2, ..., 5) along which a respective rpm difference sak(t)) is adjusted directly or indirectly at least during an engaging process by the engaging device as a function of at least the engine rpm (nmot(t)), corresponding to a value of a driving activity (Sk(t)) which is determined prior to the engaging process or prior to stopping the motor vehicle, said driving activity evaluating a driving style or a driver's actions caused by a traffic situation.

2. Method according to claim 1, wherein said driving activity (SK(t)) is determined from current and past values of a single operating parameter or a single value composed of several operating parameters of a motor vehicle, by a functional relationship, said current and past values being determined in a cyclical or anticyclical manner.

3. Method according to claims 1, wherein a first operating state occurs when the motor vehicle stops (driving speed v(t)=0) and the engine is running (nmot>0), the method further comprising the steps of:

when the first operating state occurs, storing a momentary value of the driving activity (SK(t)) at least for a period of time for which the first operating state occurs, and continuing an evaluation following this period beginning with the stored momentary value of the driving activity.

4. Method according to claim 3, wherein a second operating state occurs when the motor vehicle is parked (ignition off or both driving speed v(t)=0 as well as nmot(t)=0), the method further comprising the steps of:

when the second operating state begins, storing a momentary value of the driving activity (SK(t)) at least for a period of time for which the second operating state occurs, and continuing an evaluation following this period of time beginning with the stored momentary value of the driving activity.

5. Method according to claim 4, wherein a third operating state occurs when the motor vehicle is parked (ignition off or driving speed v(t)=0 and nmot (t)=0), the method further comprising the step of:

when the third operating state begins, automatically resetting a momentary value of the driving activity (SK(t)) to a basic value (minimum value SKmin).

6. Method according to claim 1, further comprising the step of: resetting the driving activity (SK(t)) by a manually actuated push button switch to a basic value (minimum value SKmin).

7. Method according to claim 1, the method further comprising the steps of:

selecting an engaging curve (AFK (SK (t))) from the family of several engaging curves (AFKi; i=1, 2, . . ., 5), according to which an engaging device formed of an engaging clutch connected ahead of a continuously variable transmission, is controlled as a function of at least the engine rpm (nmot(t)) during an engaging process, corresponding to the value of the driving activity (SK(t)) determined prior to the engaging process or before stopping the motor vehicle.

8. Method according to claim 7, further comprising the steps of:

adjusting a pressure on frictional elements of the engaging clutch so that the rpm difference (sak(t)dk(t)/nmot(t)=(nmot(t)−ne(t))/nmot(t)) related to the engine rpm (nmot(t)), between the engine rpm (nmot(t)) and the transmission input rpm (ne(t)), is adjusted to a specified clutch slip (saks(t)) on an engaging curve (AFK(SK(t))) for a momentary value of the engine rpm (nmot(t)).

9. Method according to claim 8, wherein the engaging curve (AFK(SK(t))) assigns increasing values of the engine rpm (nmot) to falling values of the specified clutch slip (saks(t)).

10. Method according to claim 9, further comprising the step of displacing the engaging curves (AFK(SK(t))) toward higher values of engine rpm (nmot) with increasing values of the driving activity (SK(t)).

11. Method according to claim 7, wherein the engaging clutch is freed when, during a coasting operation, a value of a differential speed (|Dv(t)| =vref(t)−v(t)|) between a speed vref(t)) of a nonpowered axle and a driving speed (v(t)) measured on a powered axle exceeds a permissible differential speed value (Dvzul(SK(t))) (|Dv(t)| >Dvzul(SK(t))).

12. Method according to claim 1, the method comprising the steps of:

selecting a converter curve of a controllable torque converter functioning as the engaging device connected ahead of a continuously variable transmission, and setting the selected converter curve softer at least in the engaging process with an increasing driving activity (SK(t)) corresponding to a value of the driving activity (Sk(t)) determined before the engaging process or before stopping the motor vehicle.

13. Method according to claim 12, wherein torque bridging clutch bridging the torque converter is freed when an amount of a differential speed ($|Dv(t)| = |vref(t)-v(t)|$) between the speed (vref(t)) of a nonpowered axle and the speed v(t)) measured on a powered axle exceeds a permissible differential velocity value (Dvzul(SK(t))) ($|Dv(t)| > Dvzul(SK(t))$).

14. Method according claim 13, wherein upon exceeding the permissible differential speed value (Dvzul(SK(t))), the method further comprises the following steps:

freeing the converter bridging clutch of a transmission equipped with a torque converter;

setting a holding time (Th(TK(t))) during which reduction of a gear ratio cannot be suppressed; and preventing an increase of the gear ratio, wherein the above steps are reset once again when a coasting operation is detected and positive values are available for the change in driving speed (v(t)), and the amount of the differential speed ($|Dv(t)|$) is less than the permissible differential speed value (Dvzul(SK(t))) ($|Dv(t)| < Dvzul(SK(t))$).

15. Method according to claim 1, wherein time intervals (T1(SK(t))), (T2(SK(t))), a holding time (Th(SK(t))) and a permissible differential speed value (Dvzul (SK(t))) depend on the driving activity (SK(t)), wherein the time intervals (T1(SK(t)) and T2(SK(t))) increase with increasing driving activity (SK(t)) and the holding time (Th(SK(t))) and the permissible differential speed value (Dvzul (SK (t))) decrease with the motor vehicle driving activity SK (t).

* * * * *